United States Patent Office.

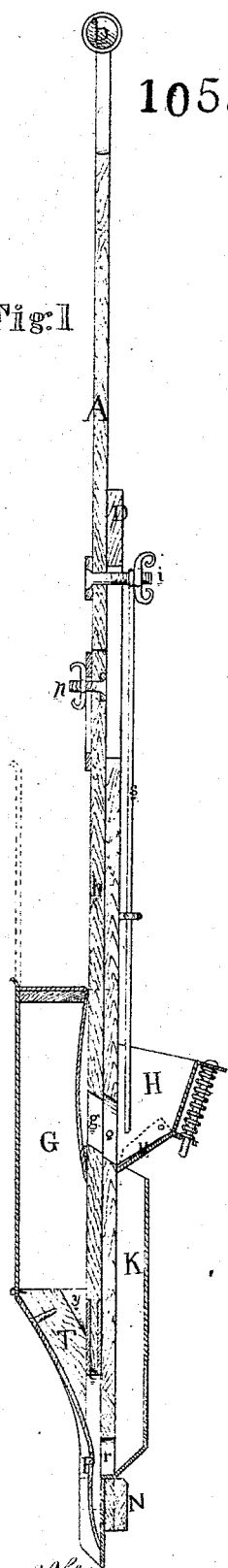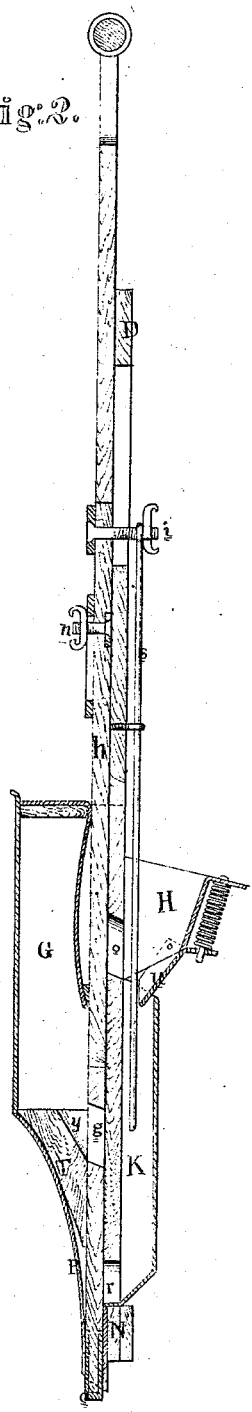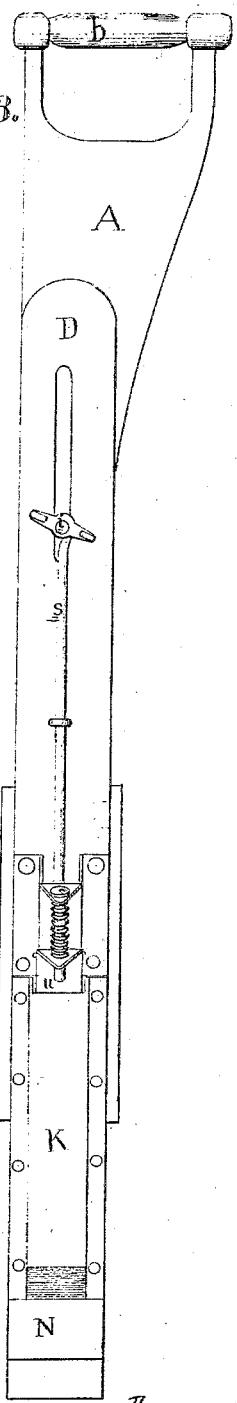

ISAAC A. KEELER, OF MIDDLEVILLE, MICHIGAN.

Letters Patent No. 105,578, dated July 19, 1870.

IMPROVEMENT IN HAND CORN-PLANTERS.

The Schedule referred to in these Letters Patent and making part of the same.

*To all whom it may concern:*

Be it known that I, ISAAC A. KEELER, of Middleville, in the county of Barry and State of Michigan, have invented a new and valuable Improvement in Hand Corn-Planters; and I do hereby declare that the following is a full, clear, and exact description of the construction and operation of the same, reference being had to the annexed drawing making a part of this specification, and to the letters and figures of reference marked thereon.

Figure 1 of the drawing is a vertical section of my corn-planter;

Figure 2 is a similar sectional view; and

Figure 3 is an external view of the same.

My invention relates to means for planting corn and other seeds, and consists in a novel arrangement of devices intended to serve as valuable improvements in corn-planters, which devices are fully described in this specification.

A of the drawing represents a plunger, and consists of a long flat strip of wood or metal, with a metallic shoe, c, and a handle, b.

A longitudinal slot is formed in this plunger, extending from a point a few inches above the shoe c upward as far as may be desirable, in which I arrange the sliding-bar h.

The bar h is made adjustable up or down in its slot by means of the nut and screw represented at n.

The letter D represents a standard, to which is attached the plunger A by the nut and screw i. I also attach to this standard the seed-box marked G, the hopper H, conduit K, and regulating-block N, together with the delivery-spring P, described hereafter, and in the manner shown on the drawing.

The letter s represents a rod, attached to the screw i at its upper end, while its lower end passes to the bottom of the hopper H, and rests against the upper surface of the valve u, which is pivoted, as shown, in the bottom of said hopper.

The letter v represents a spring, connected with the valve u in the manner shown on figs. 1 and 2, and serves to return said valve to the bottom of the hopper, and close the same after being forced downward by the rod s.

The spring P is arranged upon the lower end of the seed-box in the manner shown, and serves to keep the aperture closed at the bottom of the planter, when not forced outward by the movements downward of the plunger A.

I arrange a block, T, in the lower end of the seed-box, and cut out a recess therein, as shown at y, to conduct the seed downward.

The sliding-bar h is less in length than the slot in the plunger in which it is operated, and by means of the screw and nut n I am enabled to increase or lessen the opening in the slot at its lower end, by adjusting the sliding-bar up or down at will.

The opening in the slot not filled by the sliding-bar forms a recess of the size desired to hold such a charge of seeds as I wish to plant in one hill. This recess is marked g on the drawing.

To operate my corn-planter, I place the seed in the seed-box, and, in the place where I desire to plant a hill, press the plunger downward with force sufficient to pass the foot of the planter into the ground to the depth desired.

In forcing the plunger down the seed enters the recess g, while the shoe c forces the spring P outward. I then draw the plunger upward, and the charge of seed is brought opposite the opening o in the standard, from which it passes into the hopper H. Now, as the plunger is forced downward, the rod s opens the valve in the bottom of the hopper, and permits the charge of seed to pass down through the conduit K, through the recess r of the standard, and rest against the inner side of the spring P. From this position it is forced downward by the next downward movement of the plunger, which opens or presses said spring outward, and the corn or seed falls into the hill.

The block T is intended to regulate the depth at which the seed shall be planted, by serving as a stop to the downward movement of the planter.

I claim as my invention—

The hand corn-planter herein described, having recesses g, o, and r, plunger A, sliding-bar h, valve u, rod s, and springs v and P, constructed and arranged to operate substantially as specified.

In testimony that I claim the above, I have hereunto subscribed my name in the presence of two witnesses.

ISAAC A. KEELER.

Witnesses:
W. R. EMORY,
H. A. STARKWEATHER.